United States Patent [19]
Ara et al.

[11] Patent Number: 5,687,204
[45] Date of Patent: Nov. 11, 1997

[54] METHOD OF AND APPARATUS FOR CHECKING THE DEGRADATION OF A PRESSURE VESSEL OF A NUCLEAR REACTOR

[75] Inventors: Katsuyuki Ara; Nobuya Nakajima; Noriya Ebine, all of Ibaraki-ken, Japan

[73] Assignee: Japan Atomic Energy Research Institute, Tokyo, Japan

[21] Appl. No.: 319,629

[22] Filed: Oct. 7, 1994

[30] Foreign Application Priority Data

Oct. 8, 1993 [JP] Japan ................... 5-253025

[51] Int. Cl.[6] ........................... G21C 17/00
[52] U.S. Cl. ................ 376/249; 376/258; 376/259
[58] Field of Search ........................ 376/249, 258, 376/259; 250/306; 324/238, 262

[56] References Cited

U.S. PATENT DOCUMENTS

| | | | |
|---|---|---|---|
| 2,353,211 | 7/1944 | Zuschlag | 175/183 |
| 3,693,075 | 9/1972 | Forster | 324/40 |
| 4,445,088 | 4/1984 | Schubel | 324/238 |
| 4,622,202 | 11/1986 | Yamada et al. | 376/246 |
| 4,987,367 | 1/1991 | Ishikawa et al. | 324/227 |
| 5,059,903 | 10/1991 | Otaka et al. | 324/223 |
| 5,134,368 | 7/1992 | Otaka et al. | 324/224 |
| 5,245,279 | 9/1993 | Bendzsak | 324/225 |

*Primary Examiner*—Charles T. Jordan
*Assistant Examiner*—Meena Chelliah

[57] ABSTRACT

In a method of and an apparatus for checking the degradation of the pressure vessel of a nuclear reactor with the pressure vessel of the nuclear reactor being directly measured in a non-destructive manner, a magnetic yoke having an exciting coil and a magnetic flux measuring coil is closely placed in contact with the inner wall of the pressure vessel of the nuclear reactor. The hysteresis magnetization characteristics of the closed magnetic path formed by the magnetic yoke and the pressure vessel of the nuclear reactor are measured. The coercive forces are obtained by the hysteresis characteristics. The hardness of the material comprising the pressure vessel of the nuclear reactor at the part of the magnetic path formed in the pressure vessel of the nuclear reactor is obtained from the coercive forces and the degradation of the material comprising the pressure vessel is checked from the hardness.

12 Claims, 11 Drawing Sheets

PLANE A-A'

PLANE A-A'

METHOD OF AND APPARATUS FOR CHECKING THE DEGRADATION OF A PRESSURE VESSEL OF A NUCLEAR REACTOR

BACKGROUND OF THE INVENTION

1. Field of the Invention

The present invention relates to a method of and an apparatus for quantitatively checking the degradation of a material comprising the pressure vessel of a nuclear reactor which may become brittle due to the neutron irradiation and measuring the distribution of the degradation of the material.

2. Prior Art

It is known in the art that a material comprising the pressure vessel of a nuclear reactor will become degraded in the course of use by irradiation of fast neutrons. Thus, it has become increasingly important to check the degree of such degradation in order to assume the residual life of the nuclear reactor and also to ensure safety in the operation of the nuclear reactor. From this point of view, there has been conventionally applied such a method as a plurality of test samples of a material identical to that of the present vessel of a nuclear reactor were appropriately disposed in the nuclear reactor and taken out from time to time to be subjected to a destruction test, to thereby estimate the degree of degradation of the pressure vessel of a nuclear reactor at that point of time.

The method according to the prior art for checking the degradation of a pressure vessel of a nuclear reactor is executed by a destruction test of test samples, not by testing the pressure vessel of a nuclear reactor itself. In addition, since the quantity of test samples that are prepared for the test is limited, there is a possibility of a shortage of such samples in the case that the nuclear reactor in question is operated for an extended period of time.

Furthermore, if the pressure vessel becomes degraded excessively, heat treatment of the pressure vessel is considered for the recovery of such degradation. In this case, there is no established quantitative test available to determine the degree of such recovery of degradation.

Since the irradiation amount of fast neutrons in the pressure vessel of a nuclear reactor is different for each section of the pressure vessel and distributed in the direction of the thickness, it is not assured that the irradiation amount of fast neutrons to which the test samples are subjected are necessarily the same.

Furthermore, since the pressure vessel of a nuclear reactor is subjected to a high internal pressure in the course of actual use, the test samples which are not affected by such internal pressure are not held under a completely identical stress condition to that of the pressure vessel.

In this sense, the test results of the degradation obtained by the test samples tend to have an excessive safety factor incorporated therein.

SUMMARY OF THE INVENTION

It is an object of the present invention to provide a method of and an apparatus for checking the degradation of the pressure vessel of a nuclear reactor aiming at a direct non-destructive test of the pressure vessel of a nuclear reactor in order to solve the drawbacks as above described.

In order to attain the above-mentioned object, a method of checking the degradation of the pressure vessel of a nuclear reactor according to one aspect of the present invention comprises the steps of: closely placing a magnetic yoke having an appropriate length and cross-sectional area of the magnetic path and an exciting coil as well as a magnetic flux measuring means in contact with the inner wall or the outer wall of the pressure vessel of the nuclear reactor; measuring the hysteresis magnetization characteristics of the closed magnetic path formed by the magnetic yoke and the pressure vessel of the nuclear reactor; obtaining the coercive force from the hysteresis magnetization characteristics; and checking from the coercive force the degradation of the material comprising the pressure vessel of the nuclear reactor at the part of the magnetic path formed in the pressure vessel of the nuclear reactor.

In order to attain the above-mentioned object, an apparatus for checking the degradation of a pressure vessel of a nuclear reactor according to the present invention comprises: a magnetic yoke having an appropriate length and cross-sectional area of the magnetic path and an exciting coil as well as a magnetic flux measuring coil; a means for measuring the hysteresis magnetization characteristics of the closed magnetic path formed by the magnetic yoke and the pressure vessel of the nuclear reactor by closely placing the magnetic yoke in contact with the inner wall or the outer wall of the pressure vessel of the nuclear reactor; and a means for obtaining the coercive force from the hysteresis magnetization characteristics to check from the coercive force the degradation of the material comprising the pressure vessel of the nuclear reactor at the part of the magnetic path formed in the pressure vessel of the nuclear reactor.

As shown in FIG. 1, since the hardness of the material comprising the pressure vessel of a nuclear reactor which represents the degree of degradation of the pressure vessel of the nuclear reactor is correlated to the coercive force, if the amount of the coercive force is known, the degree of degradation of the pressure vessel of the nuclear reactor can be checked. The present invention applies this correlation and adapts the method of and the apparatus for checking the degradation of the pressure vessel of a nuclear reactor as mentioned above to closely place a magnetic yoke having an appropriate length and cross-sectional area of the magnetic path and an exciting coil as well as a magnetic flux measuring means in contact with the inner wall or the outer wall of the pressure vessel of the nuclear reactor, measure the hysteresis magnetization characteristics of the closed magnetic path formed by the magnetic yoke and the pressure vessel of the nuclear reactor, obtain the coercive force from the hysteresis magnetization characteristics and check from the coercive force the degradation of the material comprising the pressure vessel of the nuclear reactor at the part of the magnetic path formed in the pressure vessel of the nuclear reactor. Accordingly, a non-destructive method of and apparatus for directly checking the degradation of the pressure vessel of a nuclear reactor can be provided, whereby the accuracy and reliability in terms of checking the degradation of the pressure vessel of the nuclear reactor can be enhanced and both extended service life and safety in operation of a nuclear reactor can be assured.

In order to attain the above-mentioned object, another method of checking the degradation of the pressure vessel of a nuclear reactor according to another aspect of the present invention comprises the steps of: closely placing a plurality of magnetic yokes having different lengths and cross-sectional areas of magnetic paths and exciting coils as well as magnetic flux measuring means, or a magnetic yoke having a variable length and cross-sectional area of the magnetic path and an exciting coil as well as a magnetic flux measuring means in contact with the inner wall or the outer wall of the pressure vessel of the nuclear reactor; measuring the hysteresis magnetization characteristics of a plurality of the closed magnetic paths formed by the magnetic yoke(s) and the pressure vessel of the nuclear reactor, obtaining from these hysteresis magnetization characteristics, the distribution of the coercive force in the direction of thickness of the pressure vessel of the nuclear reactor; and checking from the distribution of the coercive force, the distribution of the degradation of the material comprising the pressure vessel of the nuclear reactor in the direction of thickness thereof.

In order to attain the above-mentioned object, another apparatus for checking the degradation of the pressure vessel of a nuclear reactor according to another aspect of the present invention comprises: a plurality of magnetic yokes having different lengths and cross-sectional areas of magnetic paths and exciting coils as well as magnetic flux measuring means, or a magnetic yoke having a variable length and cross-sectional area of the magnetic path and an exciting coil as well as a magnetic flux measuring means; a means for measuring the hysteresis magnetization characteristics of a plurality of the closed magnetic paths formed by the magnetic yoke(s) and the pressure vessel of the nuclear reactor by closely placing the magnetic yoke(s) in contact with the inner wall or the outer wall of the pressure vessel of the nuclear reactor; and a means for obtaining from these hysteresis magnetization characteristics, the distribution of coercive force in the direction of thickness of the pressure vessel of the nuclear reactor to check from the distribution of the coercive force the distribution of the degradation of the material comprising the pressure vessel of the nuclear reactor in the direction of thickness thereof.

As shown in FIG. 1, since the hardness of the material comprising the pressure vessel of a nuclear reactor, which represents the degree of degradation of the pressure vessel of the nuclear reactor, is correlated to the coercive force, if the amount of the coercive force is known, the degree of degradation of the pressure vessel of the nuclear reactor can be checked. The present invention applies this correlation and adapts the method of and the apparatus for checking the degradation of the pressure vessel of the nuclear reactor as mentioned above to closely place a plurality of magnetic yokes having different lengths and cross-sectional areas of magnetic paths and exciting coils as well as magnetic flux measuring means, or a magnetic yoke having a variable length and cross-sectional area of the magnetic path and an exciting coil as well as a magnetic flux measuring means, in contact with the inner wall or the outer wall of the pressure vessel of a nuclear reactor, measure the hysteresis magnetization characteristics of a plurality of the closed magnetic paths formed by the magnetic yoke(s) and the pressure vessel of the nuclear reactor, obtain from these hysteresis magnetization characteristics the distribution of the coercive force in the direction of thickness of the pressure vessel of the nuclear reactor and check the distribution of the degradation of the material comprising the pressure vessel of the nuclear reactor in the direction of thickness thereof. Accordingly, a non-destructive method of and apparatus for directly checking the degradation of the pressure vessel of a nuclear reactor can be provided, whereby the accuracy and the reliability of checking the degradation of the material comprising the pressure vessel of the nuclear reactor can be enhanced and both extended life and safety in operation of a nuclear reactor can be assured.

In order to attain the above-mentioned object, the method of checking the degradation of the pressure vessel of a nuclear reactor according to a further aspect of the present invention comprises the steps of: closely placing a magnetic yoke having an appropriate length and cross-sectional area of the magnetic path and an exciting coil, in contact with the inner wall or the outer wall of the pressure vessel of the nuclear reactor; attaching a plurality of magnetic flux sensors at the cross-sectional area of the magnetic yoke, thus closely placed in contact with the wall; divisionally measuring the hysteresis magnetization characteristics of the closed magnetic paths formed by the magnetic yoke and the pressure vessel of the nuclear reactor by the plurality of magnetic flux sensors; obtaining a plurality of coercive forces from a plurality of hysteresis magnetization characteristics measured by the respective magnetic flux sensors; obtaining from the plurality of coercive forces the distribution of the coercive forces in the direction of thickness of the pressure vessel of a nuclear reactor; and checking from the distribution of the coercive forces, the distribution of the degradation of the material comprising the pressure vessel of the nuclear reactor in the direction of thickness thereof.

In order to attain the above-mentioned object, a further apparatus for checking the degradation of the pressure vessel of a nuclear reactor according to a still further aspect of the present invention comprises: a magnetic yoke having an appropriate length and cross-sectional area of the magnetic path and an exciting coil; a plurality of magnetic flux sensors attached to the cross-sectional area of the magnetic yoke which is closely placed in contact with the inner wall or the outer wall of the pressure vessel of the nuclear reactor; a means for divisionally measuring in cooperation with the plurality of magnetic flux sensors the hysteresis magnetization characteristics of the closed magnetic path formed by the magnetic yoke and the pressure vessel of the nuclear reactor when the magnetic yoke is closely placed in contact with the pressure vessel of the nuclear reactor; and a means for obtaining a plurality of coercive forces from a plurality of hysteresis magnetization characteristics which have been measured by the divisionally measuring means, obtaining from the plurality of coercive forces the distribution of the coercive forces in the direction of thickness of the pressure vessel of the nuclear reactor and checking from the distribution of the coercive forces the distribution of the degradation of the material comprising the pressure vessel of the nuclear reactor in the direction of thickness thereof.

As shown in FIG. 1, since the hardness of the material comprising the pressure vessel of a nuclear reactor which represents the degree of degradation of the pressure vessel of the nuclear reactor is correlated to the coercive force, if the amount of the coercive force is known, the degree of degradation of the pressure vessel of the nuclear reactor can be checked. The present invention applies this correlation and adapts the method of and the apparatus for checking the degradation of the pressure vessel of a nuclear reactor as mentioned above to closely place a magnetic yoke having an appropriate length and cross-sectional area of the magnetic path and an exciting coil, in contact with the inner wall or the outer wall of the pressure vessel of the nuclear reactor, attach a plurality of magnetic flux sensors at the cross-sectional area of the magnetic yoke, thus closely placed in contact with the wall, divisionally measure the hysteresis magnetization characteristics of the closed magnetic paths formed by the magnetic yoke and the pressure vessel of the nuclear reactor by the plurality of magnetic flux sensors, obtain a plurality of coercive forces from a plurality of hysteresis magnetization characteristics measured by the respective magnetic flux sensors, obtain from the plurality of coercive forces the distribution of the coercive forces in the direction of thickness of the pressure vessel of a nuclear reactor and check from this distribution of the coercive forces, the distribution of the degradation of the material comprising the pressure vessel of the nuclear reactor in the direction of thickness thereof.

These and other objects and advantages of the present invention will become apparent upon reading the following description of the present invention with reference to the accompanying drawings.

DETAILED DESCRIPTION OF THE PREFERRED EMBODIMENTS

Figure 1:
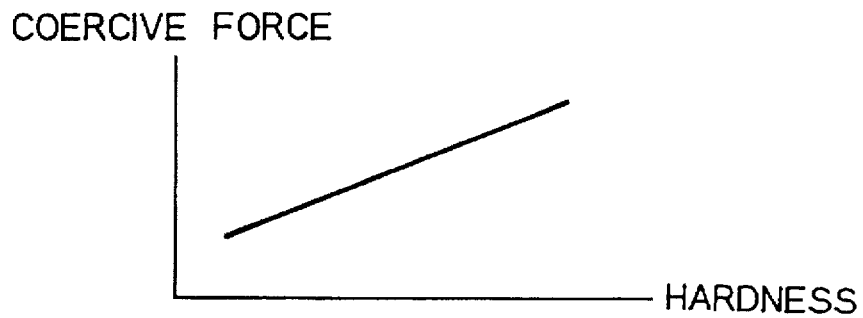
FIG. 1 is a view explaining the correlation between the hardness and the coercive force of a ferromagnetic material.

The degradation of the pressure vessel of a nuclear reactor means the degradation of the material comprising the same pressure vessel of the nuclear reactor due to irradiation by fast neutrons against the pressure vessel of the nuclear reactor occurs in the course of use. More specifically, a problem exists in that the material comprising the pressure vessel becomes harder and brittle due to what is called "Radiation Embrittlement." The degree of brittleness of the material can be naturally detected by measuring the hardness. On the other hand, however, in the case of a ferromagnetic material, it is known that a linear correlation is available as shown in FIG. 1 between the hardness and the coercive force of the material in so far as no substantial change in the metallic microstructure accompanied by a phase change will be created. Accordingly, if such a linear correlation is known, the hardness can be known by measuring the coercive force. Since most of a pressure vessel of a nuclear reactor is made of a low alloy steel having an overlay clad of non-magnetic stainless steel as an inner clad, degradation of the pressure vessel of a nuclear reactor is caused by embrittlement resulting from irradiation of the low alloy steel and the low alloy steel is a magnetic material. Accordingly, the hardness of the low alloy steel comprising the pressure vessel of the nuclear reactor can be known by measuring the coercive force, in so far as the correlation between the hardness and the coercive force of the low alloy steel is known, and the degree of degradation of the material can be checked from its hardness.

An aspect of the present invention is based on the above-mentioned concept and provides a means of measuring the coercive force of the low alloy steel comprising the pressure vessel of a nuclear reactor in a non-destructive way and determining the degree of degradation of the pressure vessel. The method and apparatus for implementing the means will now be explained by referring to FIG. 2.

Figure 2:
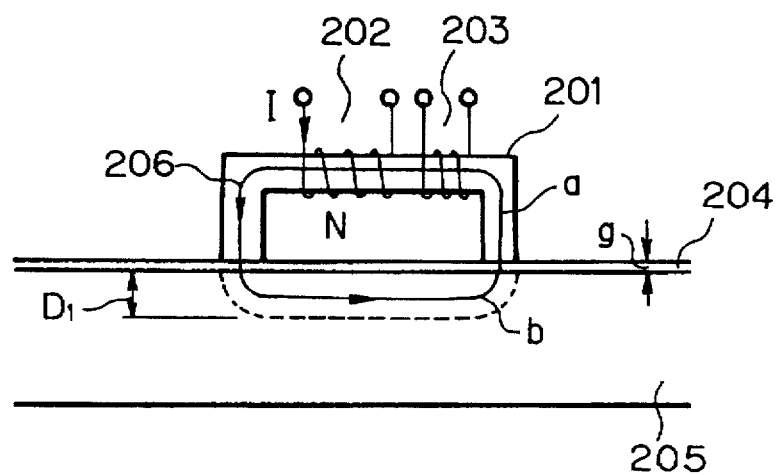
FIG. 2 is a schematic view for explaining a method of and an apparatus for measuring in a non-destructive manner the coercive force of a low alloy steel comprising the pressure vessel of a nuclear reactor, according to the present invention.
Figure 3:
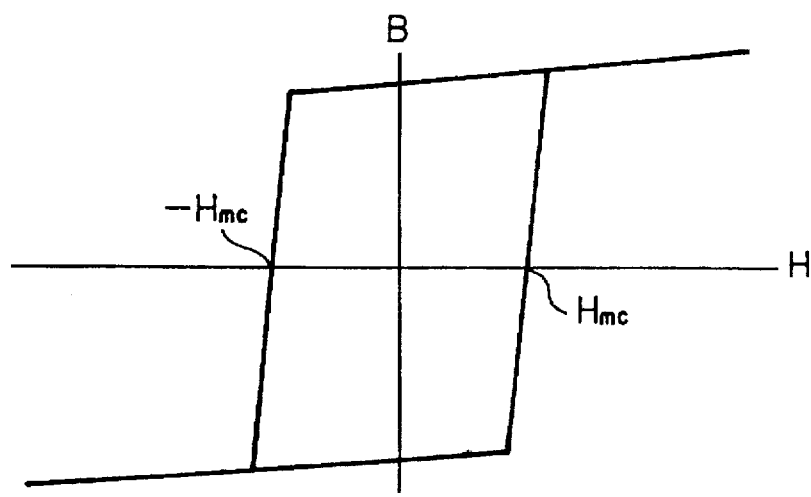
FIG. 3 illustrates the hysteresis magnetization characteristics measured by the method and apparatus shown in FIG. 2.

In FIG. 2, the reference numeral 201 designates a magnetic yoke, the numeral 202 an exciting coil having the number N of turns of windings, the numeral 203 a magnetic flux measuring coil, the numeral 204 an overlay clad of non-magnetic stainless steel for the pressure vessel of a nuclear reactor, the numeral 205 a low alloy steel comprising the pressure vessel and the numeral 206 a magnetic path, wherein the length of the magnetic path in the magnetic yoke 201 is a[m], the equivalent length of the magnetic path formed in the low alloy steel 205 is b[m] and the thickness of the overlay clad 204 is g[m]. Assuming that the saturated magnetic flux density of the magnetic yoke 201 is almost equal to the saturated magnetic flux density of the low alloy steel 205, the hysteresis magnetization characteristics for the closed magnetic path 206 which has been formed as shown in FIG. 3 can be measured by employing the method and the apparatus which are normally used. It is to be noted here that H designates the magnetic field [A/m], and B designates the magnetic flux density [T]. Using here Ampere's law for the closed magnetic path, the following equation is normally obtained if B≠0.

$$H(a+b+2g)=H_y a+2H_g g+H_c b \quad (1)$$

wherein $H_y$, $H_g$ and $H_c$ designate the magnetic fields of the magnetic path sections of the magnetic yoke 201, the overlay clad 204 of non-magnetic stainless steel and the low alloy steel 205, respectively. However, in the case of B=0, since the magnetic field $H_g$ of the magnetic path section of the overlay clad 204 of non-magnetic stainless steel is null, the above equation (1) will be:

$$H_{mc}(a+b+2g)=H_{yc} a+H_{cc} b \quad (2)$$

wherein $H_{mc}$ designates the equivalent coercive force obtained from the hysteresis magnetization characteristics which have been measured. $H_{yc}$ and $H_{cc}$ designate respectively the coercive force generated at the magnetic path sections of the magnetic yoke 201 and the low alloy steel 205. Accordingly, $$H_{cc} = \frac{H_{mc}(a+b+2g) - H_{yc} a}{b} \quad (3)$$

wherein $H_{mc}$ designates the measured value, a and g are known, b is the value which can be assumed by calculation using the finite element method or the like if the configuration of the magnetic yoke 201 has been established and $H_{yc}$ is the value which can be decided if the material of the magnetic yoke 201 is specified. Therefore, the coercive force at the magnetic path section of the low alloy steel 205 comprising the pressure vessel of a nuclear reactor can be obtained by using the equation (3). Accordingly, if the correlation between the hardness of the low alloy steel 205 in question and the coercive force is stored in the data base, the hardness of the magnetic path section of the low alloy steel 205 comprising the pressure vessel of a nuclear reactor can be obtained from the coercive force and the degree of degradation of the pressure vessel can be checked. Storage of the correlation between the hardness of the low alloy steel and the coercive force in a data base can be attained by collection of the irradiation test data conducted so far and the result of the irradiation tests which are currently under way.

Figure 4:
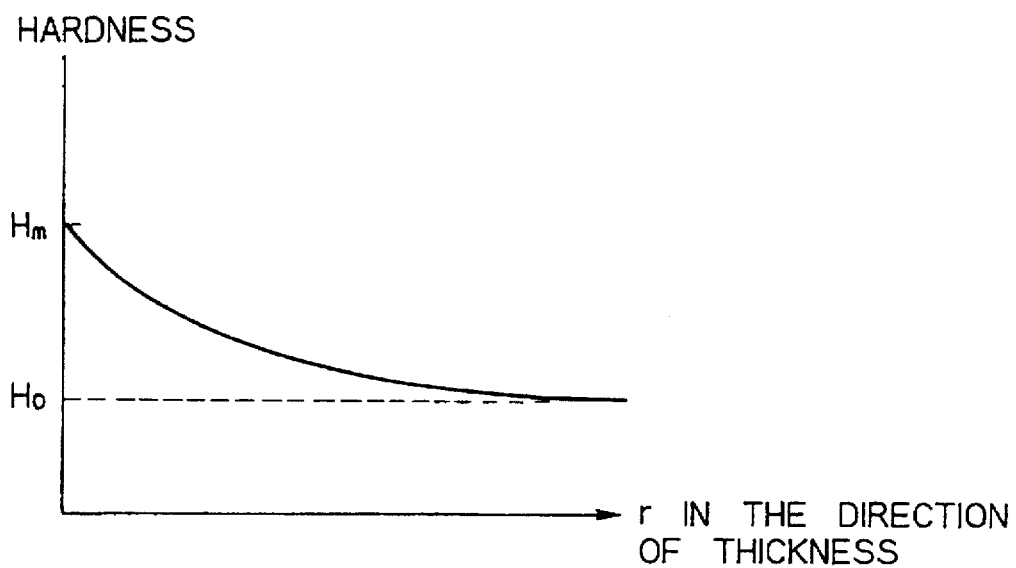
FIG. 4 illustrates the distribution of the hardness in the direction of thickness of the low alloy steel comprising the pressure vessel of a nuclear reactor.

As the degradation of the pressure vessel of a nuclear reactor is caused by irradiation of fast neutrons, the degree of degradation is greater toward the inner wall of the pressure vessel, while the degree of such degradation is attenuated toward the outer wall surface in the direction of the thickness thereof. Accordingly, the increase of the hardness due to irradiation brittleness of the low alloy steel comprising the pressure vessel of a nuclear reactor is most outstanding at the part of the surface adjacent to the inner wall of the pressure vessel while it is attenuated toward the outer wall in the direction of thickness of the pressure vessel. In general, this tendency of attenuation can be expressed by the logarithmic attenuation curve as shown in FIG. 4. It is therefore possible to positively check the degree of degradation of the pressure vessel of a nuclear reactor by determining the distribution of hardness in the direction of thickness of the wall.

An aspect of the present invention is based on the concept as mentioned above and provides a means of measuring in a non-destructive way the distribution of the coercive force in the direction of thickness of the low alloy steel comprising the pressure vessel of a nuclear rector and checking the degree of degradation of the pressure vessel. The method and apparatus for implementing the means will now be explained by referring to FIGS. 2 and 5.

Figure 5:
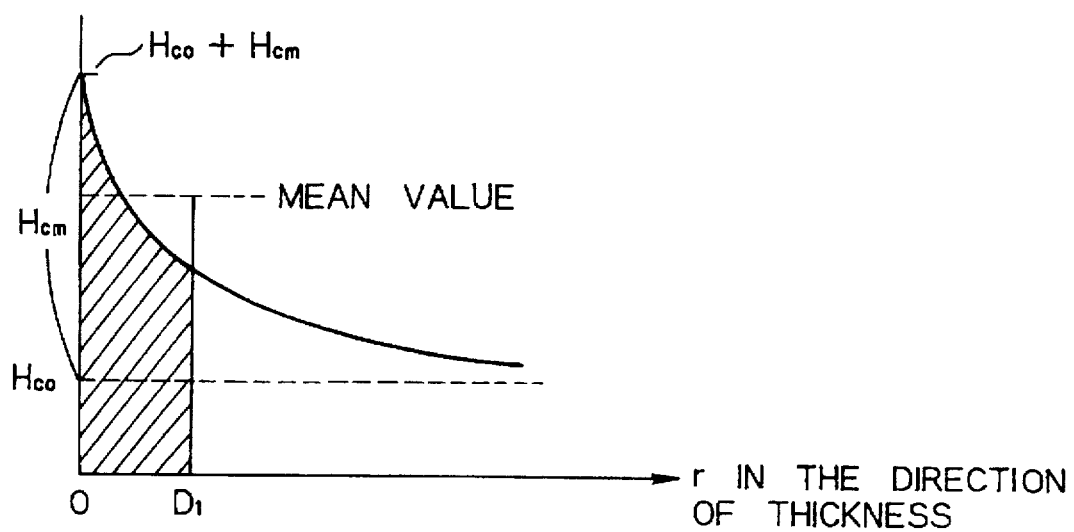
FIG. 5 illustrates the distribution of the coercive forces in the direction of thickness of the low alloy steel and the mean coercive forces to an appropriate thickness of the low alloy steel comprising the pressure vessel of a nuclear reactor.

FIG. 2 is a view explaining the function of the method of and the apparatus for measuring in a non-destructive manner the coercive force of the low alloy steel comprising the pressure vessel of a nuclear reactor and checking the degree of degradation of the pressure vessel of a nuclear reactor. In FIG. 2, assuming that the width of the magnetic path in the direction of thickness of the low alloy steel of the pressure vessel of a nuclear reactor is $D_1$, if the hardness of the low alloy steel 205 is distributed and attenuated logarithmically in the direction of thickness as shown in FIG. 4, the coercive force is also considered to be distributed and attenuated logarithmically as shown in FIG. 5. If so, it is also considered that the coercive forces at the magnetic path section of the low alloy steel 205 which have been obtained by the method and the apparatus shown in FIG. 2 represent the coercive force $H_{a1}$ of the mean value shown in FIG. 5. More specifically, if the logarithmic attenuation curve of the coercive force shown in FIG. 5 is expressed by:

$$H=H_{co}+H_{cm} \cdot exp(-r/A) \quad (4)$$

wherein $H_{co}$ designates the inherent coercive force of the low alloy steel of which value is known, $H_{cm}$ designates the maximum coercive force at the inner surface of the low alloy steel comprising the pressure vessel of a nuclear reactor which has been increased along with the irradiation brittleness and A designates an attenuation constant. Accordingly, the mean coercive force $H_{a1}$ at the magnetic path section in the low alloy steel 205 of the pressure vessel of a nuclear reactor to be measured by the method and the apparatus shown in FIG. 2 can be expressed by the following equation.

$$H_{a1} = \frac{1}{D_1} \int_0^{D_1} [H_{co} + H_{cm} \cdot exp(-r/A)] dr$$
$$= H_{co} + \left(\frac{A}{D_1}\right) H_{cm}[1 - exp(-D_1/A)] \quad (5)$$

Similarly, when the mean coercive force $H_{a2}$ for the width $D_2$ of the magnetic path in the direction of thickness of the low alloy steel comprising the pressure vessel of a nuclear reactor is measured by using another magnetic yoke having a different length and cross-sectional area of magnetic path, the following equation is obtained.

$$H_{a2} = H_{co} + \left(\frac{A}{D_2}\right) H_{cm}[1 - exp(-D_2/A)] \quad (6)$$

By uniting the equations (5) and (6), Hem and A can be obtained. If the correlation between the hardness and the coercive force of the low alloy steel is stored in the data base, the distribution of the hardness in the direction of thickness of the low alloy steel comprising the pressure vessel of a nuclear reactor can be known, so that the degree of degradation of the pressure vessel of a nuclear reactor can be checked more accurately.

Figure 6:
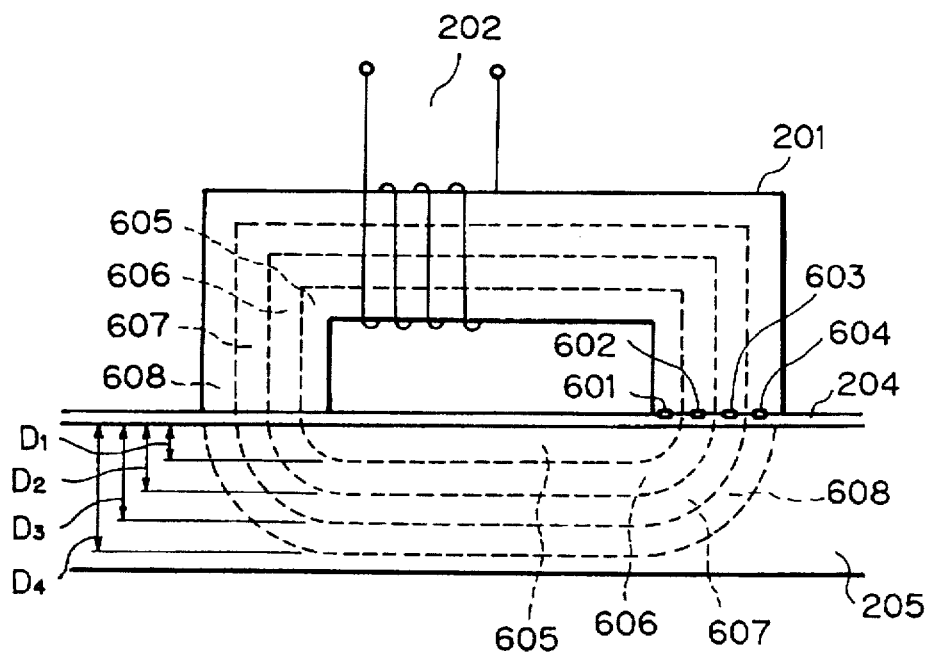
FIG. 6 is a view explaining a method of and an apparatus for measuring in a non-destructive manner the coercive forces of the low alloy steel comprising the pressure vessel of a nuclear reactor, according to the present invention.
Figure 7:
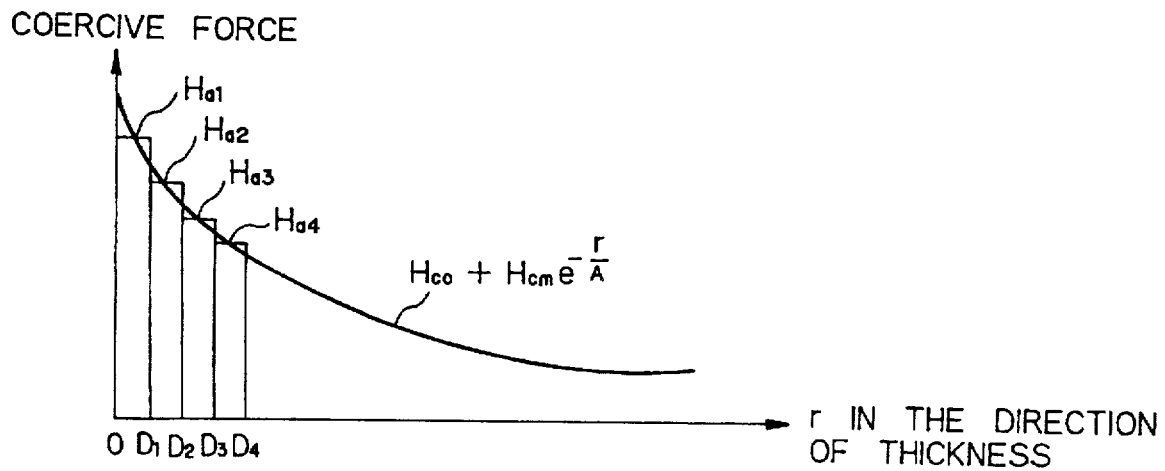
FIG. 7 illustrates the distribution of the coercive forces in the direction of thickness of the low alloy steel comprising the pressure vessel of a nuclear reactor and the mean coercive forces at an appropriate thickness of the low alloy steel at an appropriate point thereof.

The present invention also provides another means of measuring in a non-destructive manner the distribution of the coercive force in the direction of thickness of the low alloy steel comprising the pressure vessel of a nuclear reactor and checking the degree of degradation of the pressure vessel of the nuclear reactor. The method and apparatus for implementing the means will now be explained by referring to FIGS. 6 and 7. In FIG. 6, the reference numeral 201 designates a magnetic yoke, the numeral 202 an exciting coil, the numeral 204 an overlay clad, the numeral 205 a low alloy steel comprising the pressure vessel of a nuclear reactor, the numerals 601, 602, 603 and 604 magnetic flux sensors, the numerals 605, 606, 607 and 608 magnetic paths, the symbols $D_1$, $D_2$, $D_3$ and $D_4$ the depth in the direction of thickness of the low alloy steel portion 205 respectively of the magnetic paths 605, 606, 607 and 608. Now assume that the length of the part of the magnetic path 605 existing at the magnetic yoke 201 is $a_1$, the length of the part of the magnetic path 605 existing at the low alloy steel 205 is $b_1$, and those of the parts of the magnetic paths 606, 607 and 608 are respectively $a_2$, $b_2$, $a_3$, $b_3$, $a_4$ and $b_4$ in like manner. Electric current is then supplied to the exciting coil 202 and four hysteresis magnetization characteristics are measured respectively by the magnetic flux sensors 601, 602, 603 and 604. Then the measured values $H_{mc1}$, $H_{mc2}$, $H_{mc3}$, and $H_{mc4}$ of four different coercive forces are obtained. When the coercive force $H_{cci}$ (i=1–4) of the low alloy steel part 205 is searched by using the equation (3), then $H_{cc1}$, $H_{cc2}$, $H_{cc3}$ and $H_{cc4}$ are obtained respectively for the measured values $H_{mc1}$, $H_{mc2}$, $H_{mc3}$ and $H_{mc4}$. As shown in FIG. 7, $H_{cc1}$, $H_{cc2}$, $H_{cc3}$ and $H_{cc4}$ are respectively the mean coercive forces $H_{a1}$, $H_{a2}$, $H_{a3}$ and $H_{a4}$ of the low alloy steel part 205 at the magnetic paths 605, 606, 607 and 608. If the distribution of the coercive forces in the direction of thickness of the low alloy steel 205 can be expressed by the equation (4), $H_{a1}$ can be expressed by the following equation in accordance with FIG. 5 and the equation (5).

$$H_{a1} = H_{c0} + \left(\frac{A}{D_1}\right) H_{cm}[1 - \exp(-D_1/A)] \tag{7}$$

Similarly, the following equation are derived.

$$H_{ai} = H_{c0} + \left(\frac{A}{D_i - D_{(i-1)}}\right) H_{cm(i-1)}[1 - \exp\{-(D_i - D_{(i-1)})/A\}] \tag{8}$$

(i = 2, 3, 4)

$$H_{cmi} = H_{c0} + H_{cm} \cdot \exp(-Di/A) \tag{9}$$

(i = 1, 2, 3)

Accordingly by using these equations, $H_{cm}$ and A can be obtained. If the correlation between the hardness and the coercive force of the low alloy steel in question is stored in the data base, the distribution of the hardness in the direction of thickness of the low alloy steel comprising the pressure vessel of a nuclear reactor can be known so that the degree of degradation of the pressure vessel of a nuclear reactor can be checked more accurately.

Generally speaking, there are such cases as the correlation between the hardness and the coercive force cannot be expressed as a linear relation like the case of FIG. 1. However, such a data base regarding the correlation between the hardness and the coercive force of the low alloy steel as capable of describing this non-linear relation is available, no problems are encountered when checking the degradation of the pressure vessel of nuclear reactor according to the method of the present invention.

Such a case may also be considered as the distribution of the coercive force in the direction of thickness of the low alloy steel comprising the pressure vessel of a nuclear reactor cannot be represented by one simple logarithmic attenuation curve but should suitably be expressed as the sum of two logarithmic attenuation curves. In this case, since there are four unknown parameters that are to be specified, four different measurements may be executed regarding the coercive forces. These measurements include those measurements of the hysteresis magnetization characteristics from the outer wall of the pressure vessel of the nuclear reactor by the same magnetic yoke or the third and fourth magnetic yokes.

Figure 8:
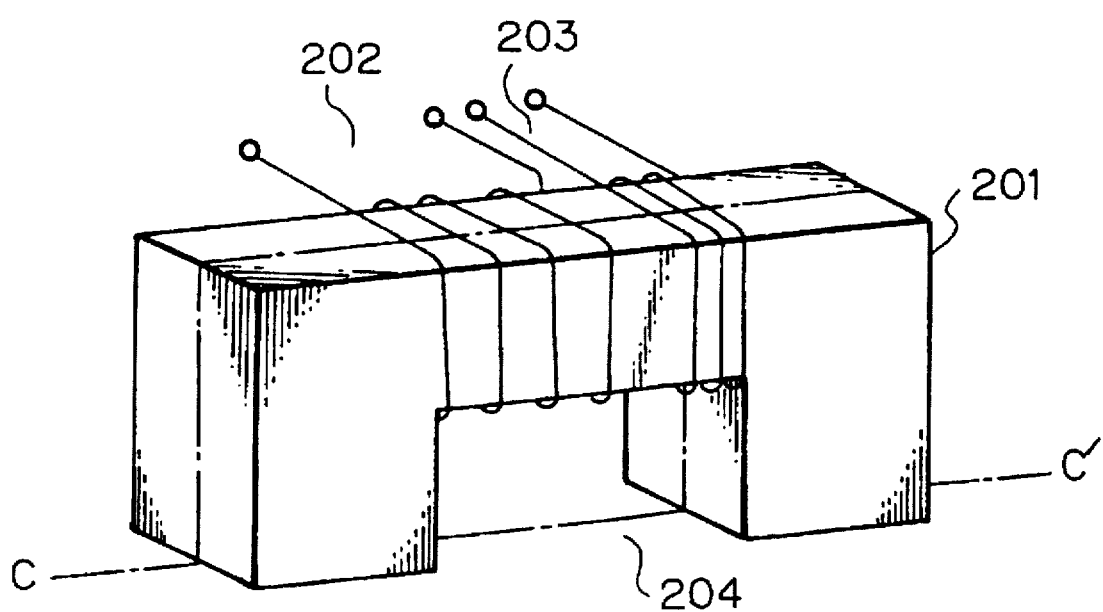
FIG. 8 is a perspective view of a magnetic yoke having an exciting coil and a magnetic flux measuring coil, the magnetic yoke being attached in contact with the pressure vessel.

It is to be noted that in actuality the flow of the magnetic fluxes in the low alloy steel comprising the pressure vessel of a nuclear reactor is widely distributed in the three dimensional direction. More specifically, in the case of the distribution of the magnetic fluxes generated by such a magnetic yoke 201 as shown in FIG. 8 in the low alloy steel 205 comprising the pressure vessel of a nuclear reactor, the magnetic fluxes are distributed as designated by 206' in FIG. 9A along the cross section C—C' and it is distributed as shown in FIG. 9B along the plane A—A' in FIG. 9A. Classifying such flows of the magnetic fluxes in the low alloy steel 205 comprising the pressure vessel of a nuclear reactor as above described, they are classified into the magnetic flux $\phi_c$ which flows through the cross sectional part immediately under the magnetic yoke in the nuclear reactor pressure vessel and the magnetic fluxes $\phi_{s1}$ and $\phi_{s2}$ which flow bypassing the cross sectional part immediately under the magnetic yoke in the nuclear reactor pressure vessel, as shown in FIG. 9C. In the explanation made so far, in order to facilitate understanding of the function, the flows of the magnetic fluxes have been represented by such simple models as shown in FIGS. 2 and 6 and considered to be only such flows like $\phi_c$ shown in FIG. 9C. Under these conditions, the equations (3) and (5) through (9) may be established, making it simple to calculate for identification of the distribution of the coercive force in the low alloy steel comprising the pressure vessel of a nuclear reactor.

Figure 9A:
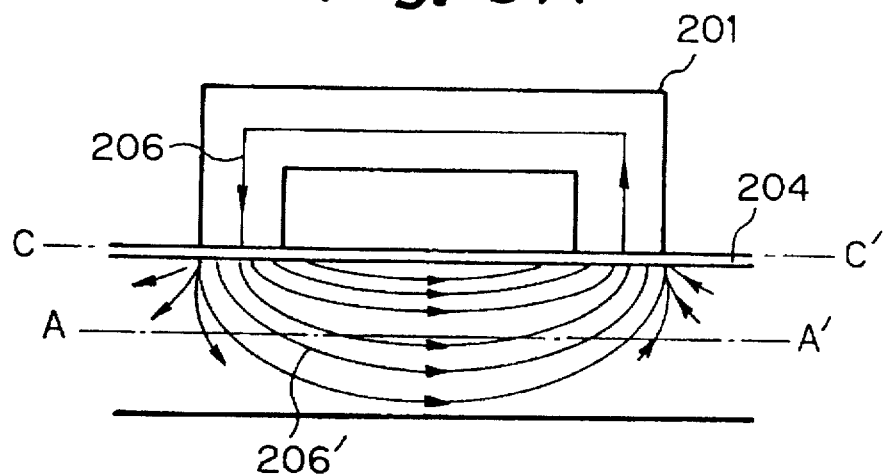
FIG. 9A is a view explaining the distribution of the magnetic flux in the pressure vessel and showing the distribution of the magnetic flux taken along the section C—C' in FIG. 8.
Figure 9B:
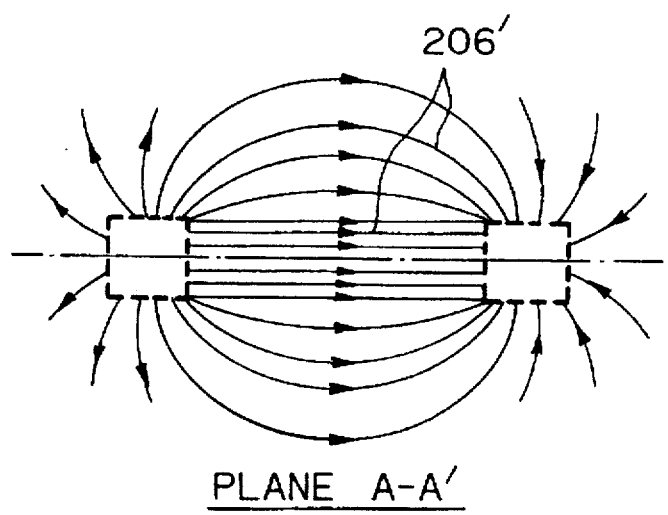
FIG. 9B illustrates the distribution of the magnetic flux taken along the plane A—A' in FIG. 9A.
Figure 9C:
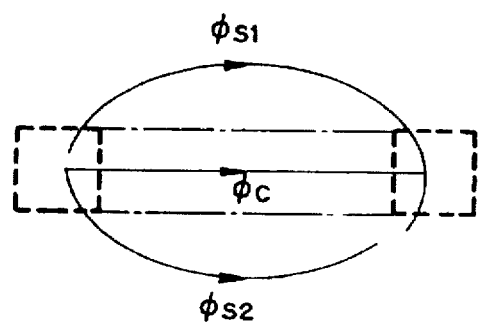
FIG. 9C classifies the flows of the magnetic fluxes shown in FIGS. 9A and 9B.

The fact that the present invention is effective even if the flow of the magnetic fluxes in the low alloy steel comprising the pressure vessel of a nuclear reactor is widely distributed in the three dimensional direction as shown in FIGS. 9A through 9C will now be explained. In such a case, the coercive force to be measured by the magnetic yoke 201 shown in FIG. 8 is measured as the magnetomotive force $(NI)_c$ of causing the amount of the magnetic fluxes in the magnetic yoke 201 to become null. N represents the number of turns of winding of the exciting coil 202 and I represents the exciting current. In this case, the measured value $(NI)_c$ is provided as the function of the magnetic characteristics and the geometrical configuration of the magnetic yoke 201, the number of turns of winding of the exciting coil 202 and the magnetic flux measuring coil 203, group of the known parameters of the thickness of the overlay clad and the thickness of the low alloy steel part of the pressure vessel of a nuclear reactor, and the unknown parameters $H_{cm}$ and A which are to specify the distribution of the coercive forces in the low alloy steel part to be identified. Here it is assumed that the distribution of the coercive force in the low alloy steel may be specified by the equation (4). Namely, $$(NI)_c = f(G, H_{cm}, A) \tag{10}$$

Accordingly if G is fixed, the value of the function f can be analytically obtained for some combinations of $H_{cm}$ and A by utilizing such magnetic field analyzing means as the conventional definite element method or the conventional boundary element method. Accordingly, if unknown parameters to be determined are two of $H_{cm}$ and A, measurement of $(NI)_c$ is made by using two different magnetic yokes respectively to obtain $(NI)_{c1}$ and $(NI)_{c2}$, then $$(NI)_{c1} = f_1(G_1, H_{cm}, A) \tag{11}$$

$$(NI)_{c2} = f_2(G_2, H_{cm}, A) \tag{12}$$

Whereby $H_{cm}$ and A can be identified.

Next, a case is considered wherein magnetic flux sensors 1 and 2 are respectively placed at two different portions on the portion of the magnetic yoke 201 shown in FIG. 8 in contact with the pressure vessel of a nuclear reactor, and the magnetomotive force $(NI)_c$ is then measured when the fluxes respectively detected by the magnetic flux sensors become null. In this case, the following equations are obtained as corresponding to the equations (11) and (12).

$$(NI)_{c1} = g_1(G_1, s_1, H_{cm}, A) \quad (13)$$

$$(NI)_{c2} = g_2(G_1, s_2, H_{cm}, A) \quad (14)$$

wherein $s_2$ and $s_2$ are known constants designating the positions of the magnetic flux sensors 1 and 2. The functions $g_1$ and $g_2$ can be analytically obtained by such magnetic field analyzing means as the definite element method and the boundary element method as done before. Accordingly, it is possible to identify $H_{cm}$ and A from the equations (13) and (14).

Figure 10A:
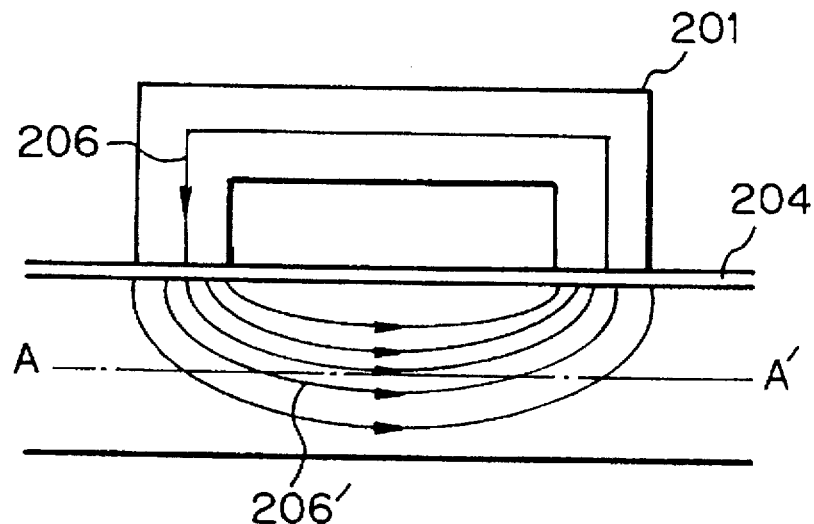
FIG. 10A is a view explaining that the distribution of the magnetic fluxes in the pressure vessel is spatially limited, and illustrates the distribution of the magnetic flux taken along the section C—C' in FIG. 8.
Figure 10B:
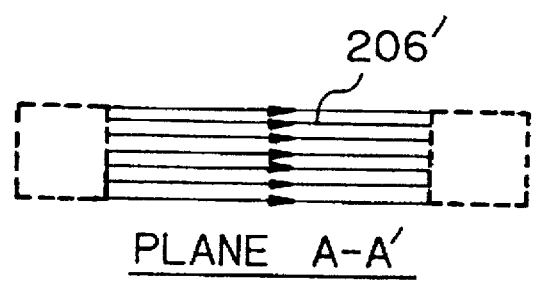
FIG. 10B illustrates the distribution of the magnetic fluxes taken along the plane A—A' in FIG. 9A when the distribution of the magnetic flux in the pressure vessel is spatially limited.
Figure 10C:
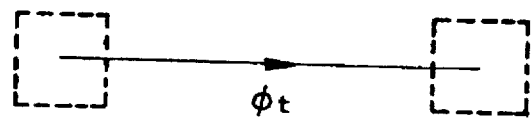
FIG. 10C illustrates the flows of the magnetic fluxes shown in FIGS. 9A and 9B as one flow when the distribution of the magnetic fluxes in the pressure vessel is spatially limited.

The constructions of the magnetic yoke, the exciting coil and the magnetic flux measuring coil of which simple magnetic path models shown in FIGS. 2 and 6 are formed by a technical engineering means to simplify thereby the assumption calculation for the distribution of the coercive forces in the pressure vessel of a nuclear reactor will be explained next. In other words, such constructions serve to cause the magnetic flux 206' in the pressure vessel of a nuclear reactor generated by the magnetic yoke 201 shown in FIG. 9A to flow in concentration only in the sectional area immediately under the magnetic yoke, as shown in FIGS. 10A through 10C, by a technical engineering means instead of flowing in the three dimensional direction. There exists between $\phi_c$, $\phi_{s1}$ and $\phi_{s2}$ shown in FIG. 9C and $\phi_t$ shown in FIG. 10C the following equation.

$$\phi_t = \phi_c + \phi_{s1} + \phi_{s2} \quad (15)$$

wherein $\phi_t$ is equivalent to the total magnetic fluxes which flow through the magnetic yoke.

Figure 11:
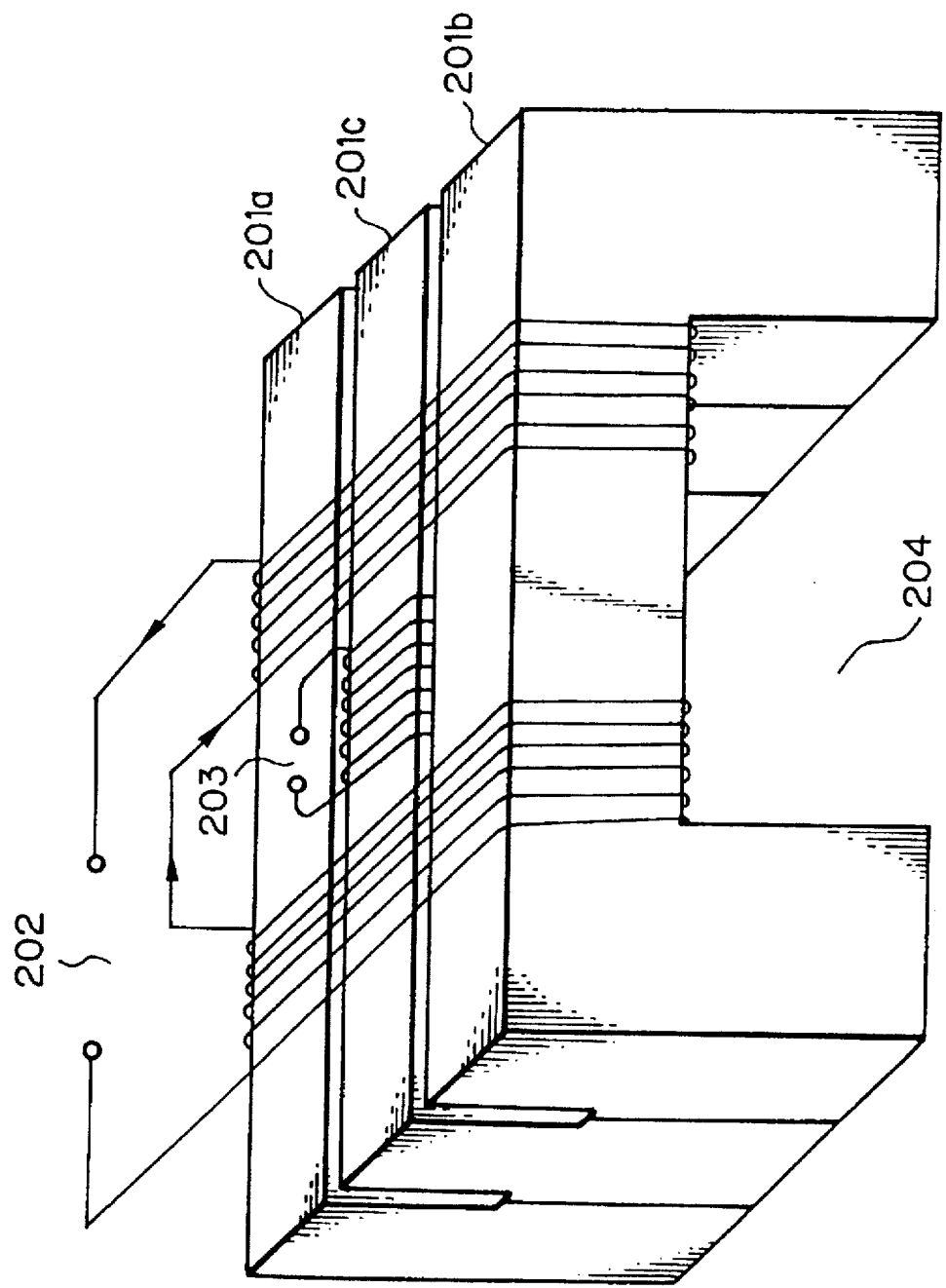
FIG. 11 is a view explaining a method and an apparatus according to the present invention for measuring in a non-destructive way the coercive force of the low alloy steel comprising the pressure vessel of a nuclear reactor.

One of the constructions of the magnetic yoke, the exciting coil and the magnetic flux measuring coil which actually make the equation (15) effective are shown in FIG. 11. As shown in FIG. 11, a magnetic yoke 201 is comprised of three yoke sections 201a, 201b and 201c and a magnetic flux measuring coil 203 is wound only around the yoke section 201c. If the magnetic flux in the sectional area immediately under the yoke section 201c alone is considered by assuming a normal flow of the magnetic flux as shown in FIG. 9C, the magnetic flux which flows through the yoke section 201c is split into the magnetic flux $\phi_c$ flowing in the sectional area immediately under the yoke section 201c in the nuclear reactor pressure vessel and the magnetic fluxes $\phi_{s1}$ and $\phi_{s2}$ flowing respectively bypassing the sectional area leftwardly and rightwardly. This can also be said of the yoke sections 201a and 201b. Then, by adjusting the thickness of the yoke sections 201a and 201b and the configuration, etc. of the portions thereof in contact with the pressure vessel of a nuclear reactor, the magnetic flux generated by the yoke section 201a in the sectional area immediately under the yoke section 201c in the pressure vessel of a nuclear reactor may be formed as the magnetic flux $\phi_{s1}$ and the magnetic flux generated by the yoke section 201b may be formed as the magnetic flux $\phi_{s2}$, the consequence, the total amount of the magnetic fluxes $\phi_t$ generated in the sectional area immediately under the yoke section 201c in the pressure vessel of a nuclear reactor are $\phi_t = \phi_c + \phi_{s1} + \phi_{s2}$ to enable the equation (15) to be effectively established. As the result, the magnetic path model shown in FIG. 2 can be realized, whereby the assumption calculation of the distribution of the coercive force in the pressure vessel of a nuclear reactor can become simple. Furthermore, if such a magnetic path model is established, the magnetic field analysis such as the definite element method or the boundary element method can be the calculation of the two dimension, whereby the calculation can be simplified.

Figure 12A:
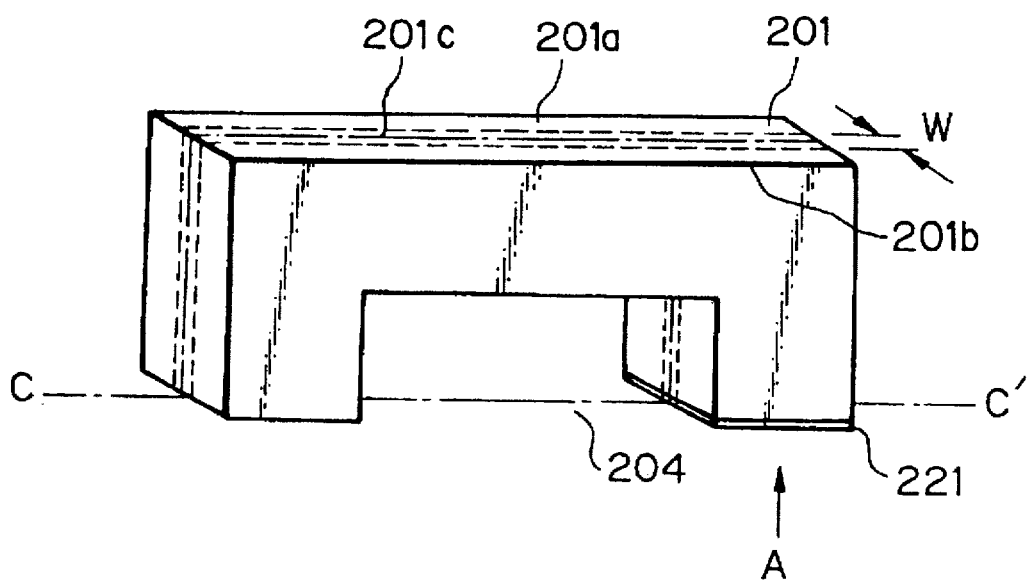
FIG. 12A is a view explaining a method of and an apparatus for measuring in a non-destructive way the coercive forces of the low alloy steel comprising the pressure vessel of a nuclear reactor, according to the present invention.
Figure 12B:
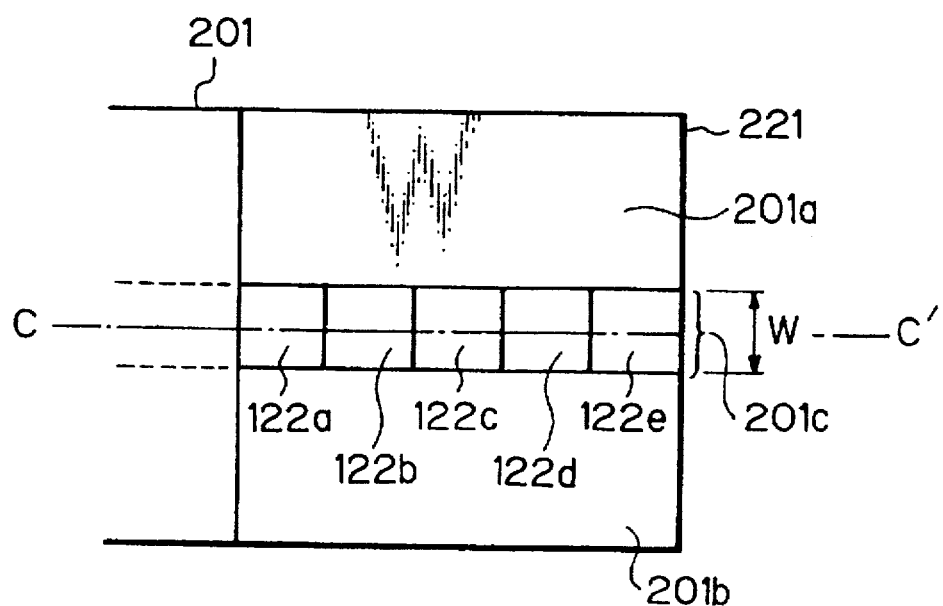
FIG. 12B illustrates a magnetic yoke as viewed in the direction of the arrow A in FIG. 12A.

FIG. 12A illustrates a construction of a magnetic yoke which is capable of effectively realizing the magnetic path model shown in FIG. 6. In FIG. 12A, assume that the yoke section having the width of w in proximity with the central sectional plane C—C' of the magnetic yoke 201 is regarded as 201c and the yoke sections at both sides of the yoke section 201c are regarded respectively as 201a and 201b, then the equation (15) is applied to the magnetic path in the yoke section 201c as well as the magnetic path in the sectional area immediately under the yoke section 201 in the pressure vessel of a nuclear reactor owing to the same effect as that shown in FIG. 11. Accordingly, as shown in FIG. 12B which is a view of the magnetic yoke 201 viewed in the direction indicated by the arrow A in FIG. 12A, if the magnetic flux sensors 122a–122e are attached to the part 221 of the yoke section 201c in contact with the pressure vessel of a nuclear reactor, the magnetic path model shown in FIG. 6 can be effectively realized, whereby the assumption calculation of the coercive force in the pressure vessel of a nuclear reactor can be made simple. Furthermore, if such a magnetic path model is established, the magnetic field analysis such as the definite element method or the boundary element method can be the calculation of the two dimension, whereby calculation can be simplified.

Figure 13A:
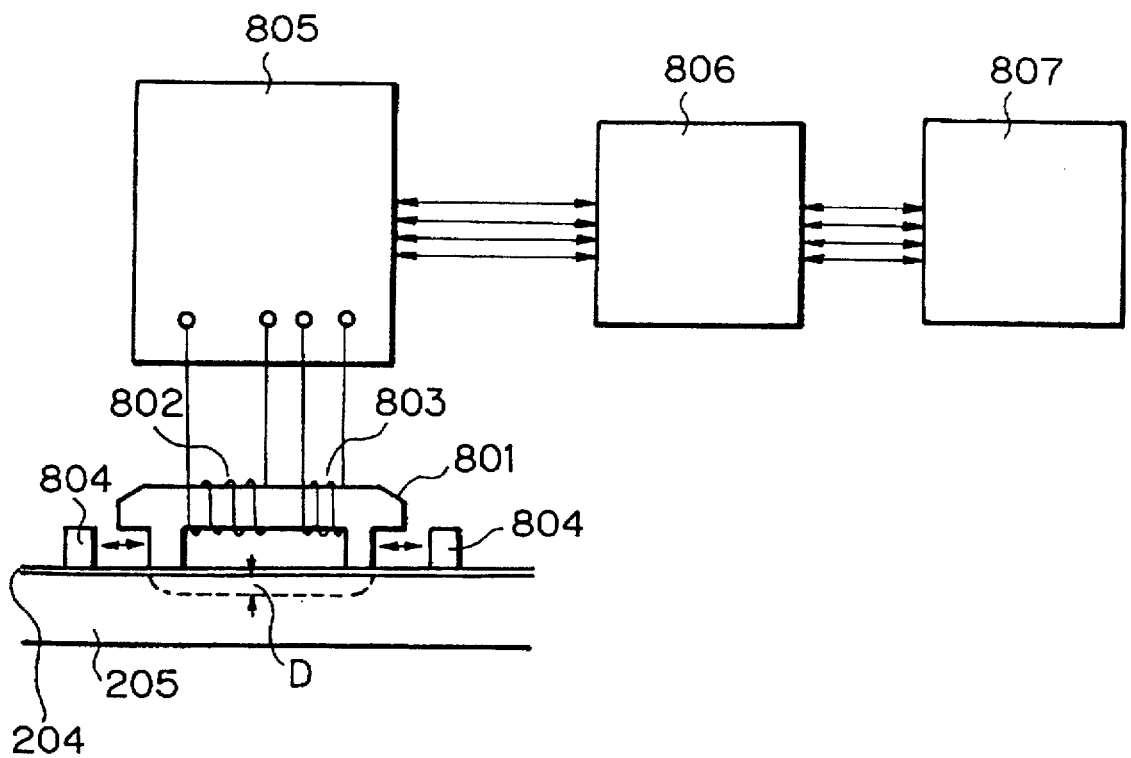
FIG. 13A is a view explaining an embodiment of the present invention illustrating a more concrete constitution of the present invention, with the magnetic yoke 804 being removed from a magnetic circuit.
Figure 13B:
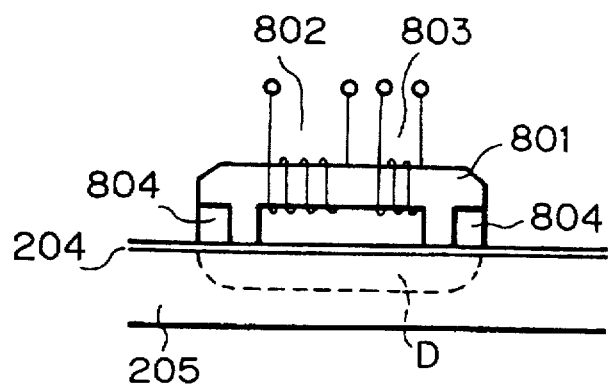
FIG. 13B illustrates the magnetic yoke 804 shown in FIG. 13A as inserted in the magnetic circuit.

An embodiment of the present invention showing the more concrete construction thereof are illustrated in FIGS. 13A and 13B. In FIGS. 13A and 13B, the reference numeral 204 designates an overlay clad of the non-magnetic stainless steel for the pressure vessel of a nuclear reactor and the numeral 205 designates a low alloy steel comprising the nuclear reactor pressure vessel. The reference numeral 801 designates a magnetic yoke having the exciting coil 802 and the magnetic flux measuring coil 803. The reference numeral 804 designates the magnetic yoke piece adapted to vary the sectional area of the end portions of the magnetic yoke 801 so as to vary the cross-sectional area and the length of the equivalent magnetic path of the closed magnetic circuit to be formed by the magnetic yoke. The components designated by the reference numerals 801 and 804 can be formed as the three split yoke sections as shown in FIG. 11. FIG. 13A illustrates the condition in which the magnetic yoke pieces 804 are removed from the magnetic circuit while FIG. 13B illustrates the condition in which the magnetic yoke pieces 804 are inserted in the magnetic circuit. In the case of the condition shown in FIG. 13B, the cross-sectional area and the length of the magnetic path are larger than those in the case of the condition shown in FIG. 13A, such that the width D of the magnetic path in the direction of thickness of the low alloy steel 205 comprising the pressure vessel of a nuclear reactor is large. Reference numeral 805 designates a hysteresis magnetization characteristics measuring apparatus, the numeral 806 a computer for control and data analysis, and the numeral 807 a data base. In the data base, there are stored the correlation between the hardness and the coercive force of a variety of low alloy steels for the pressure vessels of nuclear reactors and the decision criteria of the distribution of the hardness of the low alloy steel in the direction of the thickness thereof and the degree of degradation of the pressure vessels of nuclear reactors. In accordance with the commands from the computer 806 for control and data analysis, attachment and detachment of the magnetic yoke pieces 804 relative to the magnetic yoke 801 may be automatically executed and the hysteresis magnetization characteristics of two different formed magnetic circuits may be measured by automatically operating the hysteresis magnetization measuring apparatus 805, so that the coercive forces provided by the respective magnetic circuits can be detected. And the distribution of the coercive forces in the direction of thickness of the low alloy steel 205 comprising the pressure vessel of a nuclear reactor may be analyzed by using two values of the coercive forces thus obtained. In order to enhance the accuracy of this analysis, conventional methods such as the definite element method or boundary element method for obtaining the distribution of the magnetic fluxes in the low alloy steel may be employed. When the distribution of the coercive forces have been obtained by the analysis, the distribution of the coercive forces are compared to the data stored in the data base 807 to convert the coercive forces distribution into the distribution of the hardness, from which the degree of degradation of the pressure vessel of a nuclear reactor can be decided.

Figure 14:
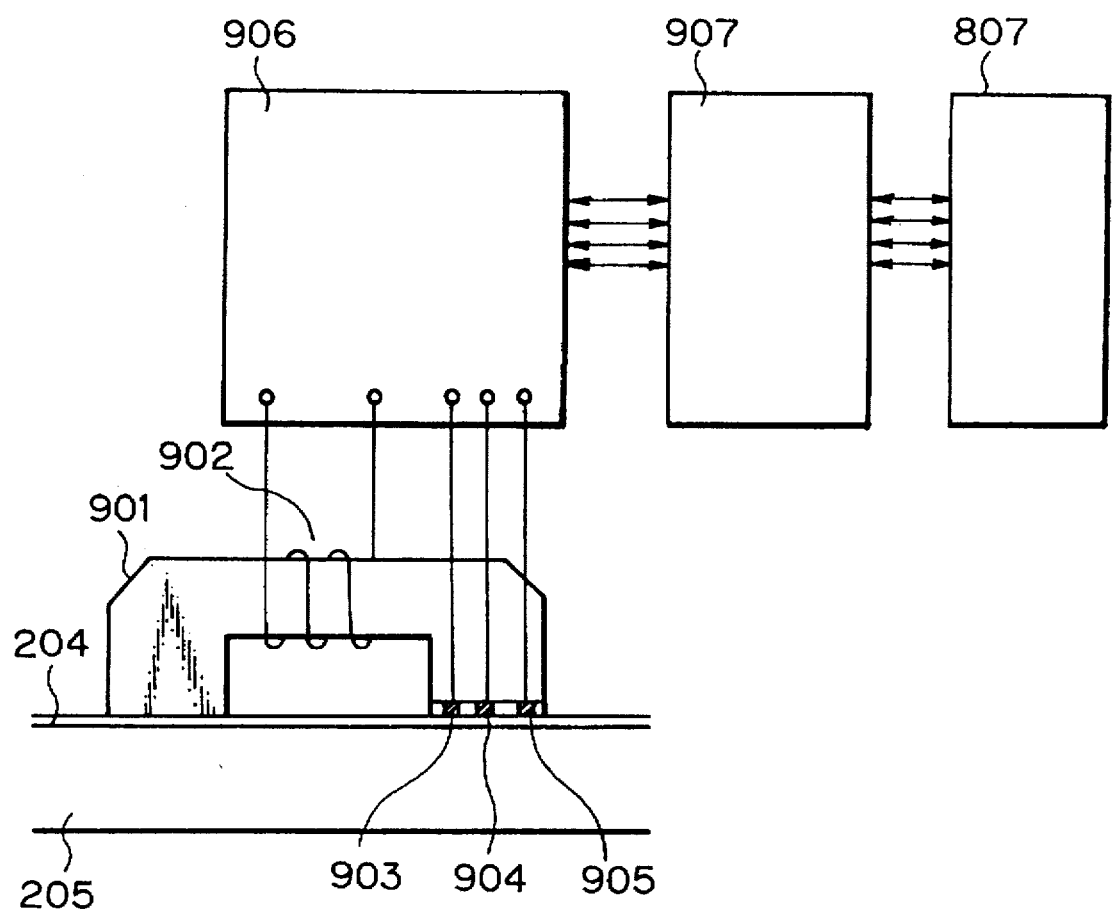
FIG. 14 is a view explaining another embodiment illustrating a more concrete constitution of the present invention.

A further embodiment of the present invention showing a more concrete construction thereof is illustrated in FIG. 14. In FIG. 14, the reference numeral 901 designates a magnetic yoke, the numeral 902 an exciting coil, the numerals 903, 904 and 905 magnetic flux sensors such as Hall elements or magnetic resistance elements, the numeral 906 a hysteresis magnetization measuring apparatus, the numeral 907 a computer for control and data analysis, and the numeral 807 the same data base as shown in the embodiment illustrated in FIG. 13A. The magnetic flux sensors 903, 904 and 905 are, as shown in FIG. 12B, attached to the central portion of the sectional area of the magnetic path of the magnetic yoke. By the commands from the computer 907 for control and data analysis, the hysteresis magnetization characteristics measuring apparatus 906 is automatically operated to measure the hysteresis magnetization characteristics respectively by three magnetic flux sensors 903–905. Then, the three values of the coercive forces thus obtained by this measurement are used to analyze the distribution of the coercive forces in the direction of thickness of the low alloy steel 205 comprising the pressure vessel of a nuclear reactor. In order to enhance the accuracy of this analysis, conventional methods such as the definite element method and boundary element method for obtaining the distribution of the magnetic flux in the low alloy steel may be employed. When the distribution of the coercive forces has been obtained by the analysis, the result is compared to the data stored in the data base 807 and the distribution of the coercive forces is converted into the distribution of the hardness, from which the degree of degradation of the pressure vessel of a nuclear reactor can be decided.

Figure 15A:
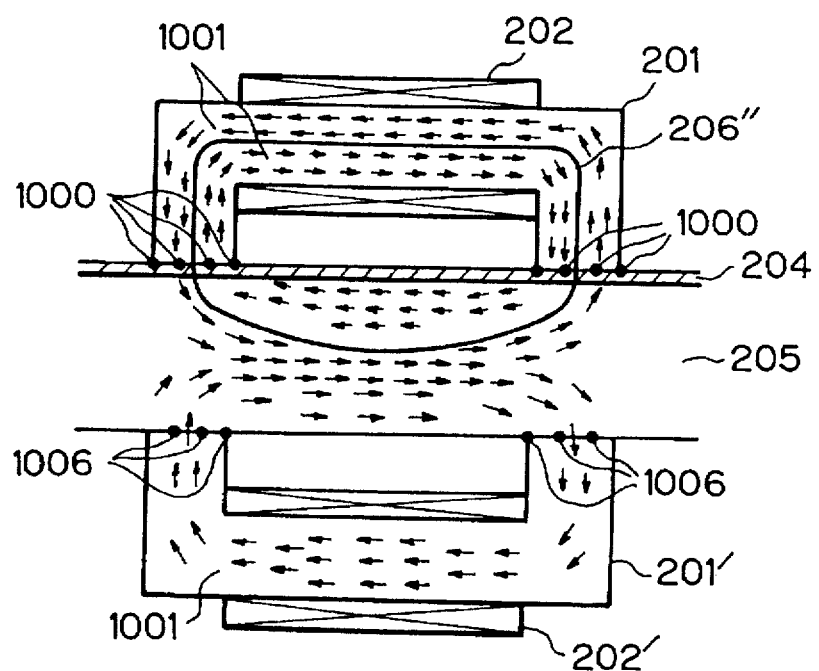
FIG. 15A is a view explaining a further embodiment illustrating a more concrete constitution of the present invention and specifically illustrates a magnetic yoke portion.
Figure 15B:
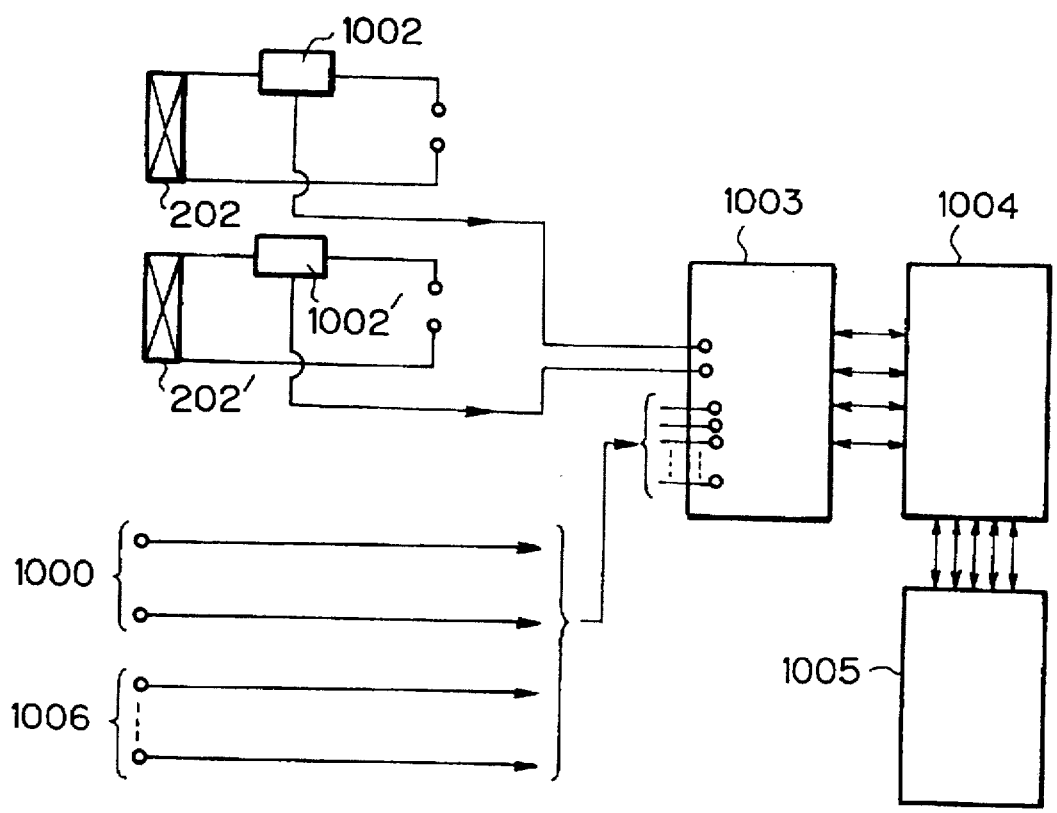
FIG. 15B illustrates a power source control and signal processing section in the embodiment shown in FIG. 15A.

FIGS. 15A and 15B are views explaining a still further embodiment of the present invention showing a more concrete construction thereof. According to the embodiment shown in FIGS. 15A and 15B, a magnetic yoke is provided also at the outside of the pressure vessel of a nuclear reactor so as to form different magnetic paths like those shown in FIG. 6 efficiently and at the targeted locations in a controllable manner. FIG. 15A illustrates such a magnetic yoke section while FIG. 15B illustrates a power source control and signal processing section. In FIG. 15A, the reference numeral 201 designates a magnetic yoke attached to the inner side of the pressure vessel of the nuclear reactor or the surface of the overlay clad 204 of non-magnetic stainless steel and the reference numeral 201' designates a magnetic yoke attached to the outside of the pressure vessel of a nuclear reactor or the outer surface of the low alloy steel 205. Reference numerals 202 and 202' designate exciting coils wound around the magnetic yokes 201 and 201' respectively, the numeral 206" the magnetic path of which magnetic flux density is null, the numerals 1000 and 1006 a group of magnetic flux sensors constituted by a plurality of Hall elements or the like respectively, and the numeral 1001 arrows representing the flows and the direction thereof of the magnetic fluxes. In FIG. 15B, those portions designated by the same reference numerals as employed in FIG. 15A designate identical components to those employed in FIG. 15A, and the reference numerals 1002 and 1002' designate exciting current controllers adapted to control the amount of the electric current flowing through the exciting coils 202 and 202' respectively. The reference numeral 1003 designates a hysteresis magnetization characteristics measuring apparatus, the numeral 1004 a computer for control and data analysis and the numeral 1005 a data base.

According to the present embodiment, the exciting current flowing through the exciting coils 202 and 202' are at first controlled by the exciting current controllers 1002 and 1002' and the magnetic yokes 201 and 201' are magnetized from the condition of null magnetization to the saturated condition of magnetization. The direction of magnetization at this time is made in a manner that the magnetic fluxes generated in the respective magnetic yokes 201 and 201' have the same direction in the low alloy steel 205 comprising the pressure vessel of a nuclear reactor so as to sum them. Subsequently, magnetization of the magnetic yoke 201 alone is reduced and then oppositely magnetized, with the magnetic yoke 201' being kept in a saturated condition. As the opposite magnetization proceeds appropriately, two different magnetic fluxes in the opposite directions to each other are generated in the magnetic yoke 201 and the low alloy steel comprising the pressure vessel of the nuclear reactor as shown in FIG. 15A. At the boundary of the flows of these two magnetic fluxes, there is formed the magnetic path 206" of which magnetic flux density is null. Accordingly, since the equations (2) and (3) as earlier mentioned can be applied to this magnetic path 206", the mean coercive force at the part of this magnetic path 206" in the low alloy steel 205 can be obtained. Accordingly, the density of the magnetic flux generated around the magnetic yokes 201 and 201' in the course of magnetization as described above is measured by the group of the magnetic flux sensors 1000. The signals representing the density of the magnetic flux, thus measured and the exciting current value signals representing the amount of the electric current flowing respectively through the exciting coils 202 and 202' are supplied to the hysteresis magnetization characteristics measuring apparatus 1003 and a plurality of the hysteresis magnetization curves are measured by each sensor of the groups of the magnetic flux sensors 1000 and 1006. Then, the values of a plurality of the coercive forces thus obtained by the measurements are transmitted to the computer 1004 for control and data analysis where the distribution of the coercive forces in the direction of thickness of the low alloy steel 205 comprising the pressure vessel of a nuclear reactor is analyzed. It is to be understood that the group of the magnetic flux sensors 1006 are intended to mainly monitor the magnitude of magnetization provided by the magnetic yoke 201' and that the data of the hysteresis magnetization curves to be measured by each sensor of the group of the magnetic flux sensors 1006 are not required for analysis of the distribution of the coercive forces in the direction of thickness of the low alloy steel 205 comprising the pressure vessel of a nuclear reactor.

It is also to be understood that conventional methods for obtaining the distribution of the magnetic fluxes in the low alloy steel 205 by the definite element method or the boundary element method may be utilized in order to enhance the accuracy of the analysis. When the distribution of the coercive forces have been obtained by the analysis as above described, the computer 1004 for control and data analysis functions compares the distribution of the coercive forces with the data stored in the data base and converts the coercive forces distribution into the distribution of the hardness to decide the degree of degradation of the pressure vessel of a nuclear reactor in accordance with the distribution of the hardness.

The present invention having been described in detail by referring to certain preferred embodiments, it will be understood that any changes and modifications can be effected within the spirit and the scope of the claims of the present invention.

What is claimed is:

1. A method of checking the degradation of the pressure vessel of a nuclear reactor comprising the steps of:
    closely placing a magnetic yoke having an appropriate length and cross-sectional area of a magnetic path, an exciting coil, and a magnetic flux measuring means in contact with the inner wall or the outer wall of said pressure vessel of the nuclear reactor;
    measuring hysteresis magnetization characteristics of a closed magnetic path formed by said magnetic yoke and said pressure vessel of the nuclear reactor;
    obtaining a coercive force from the hysteresis magnetization characteristics; and
    checking, from the coercive force, the degradation of a material comprising said pressure vessel of the nuclear reactor at a portion of the magnetic path formed in said pressure vessel,
    wherein said magnetic yoke is divided into three parallel magnetic circuits including a right magnetic yoke, a central magnetic yoke and a left magnetic yoke, and said magnetic flux measuring means including a magnetic flux measuring coil being wound around said central magnetic yoke to measure the hysteresis magnetization characteristics.

2. A method of checking the degradation of the pressure vessel of a nuclear reactor as claimed in claim 1, wherein a plurality of magnetic flux sensors are attached to a sectional area of said central magnetic yoke which is closely placed in contact with the pressure vessel of the nuclear reactor to measure the hysteresis magnetization characteristics.

3. A method of checking the degradation of the pressure vessel of a nuclear reactor comprising the steps of:
    closely placing a first magnetic yoke having an appropriate length and cross-sectional area of a first magnetic path, a first exciting coil, and a magnetic flux measuring means in contact with the inner wall or the outer wall of said pressure vessel of the nuclear reactor;
    measuring hysteresis magnetization characteristics of a closed magnetic path formed by said first magnetic yoke and said pressure vessel of the nuclear reactor;
    obtaining a coercive force from the hysteresis magnetization characteristics;
    checking, from the coercive force, the degradation of a material comprising said pressure vessel of the nuclear reactor at a potion Of the first magnetic path formed in said pressure vessel;
    closely placing a second magnetic yoke having an appropriate length and cross-sectional area of a second magnetic path and a second exciting coil, in contact with the outer wall or the inner wall opposite to the inner wall or the outer wall of said pressure vessel of the nuclear reactor closely in contact with or in proximity to said first magnetic yoke, opposite to said first magnetic yoke;
    forming a plurality of closed magnetic paths in said first and second magnetic yokes and said pressure vessel of the nuclear reactor by magnetizing said first magnetic yoke and said second magnetic yoke by said first and second exciting coils of said first magnetic yoke and said second magnetic yoke;
    measuring hysteresis magnetization characteristics of the plurality of closed magnetic paths;
    obtaining from the hysteresis magnetization characteristics of the plurality of closed magnetic paths the distribution of coercive forces in the direction of thickness of the pressure vessel of the nuclear reactor; and
    checking, from the distribution of the coercive forces, the distribution of the degradation of the material comprising the pressure vessel of the nuclear reactor in the direction of thickness thereof.

4. An apparatus for checking the degradation of the pressure vessel of a nuclear reactor comprising:
    a magnetic yoke having an appropriate length and cross-sectional area of a magnetic path, an exciting coil, and a magnetic flux measuring coil, said magnetic yoke divided three parallel magnetic circuits including a right magnetic yoke, a central magnetic yoke and a left magnetic yoke, said magnetic flux measuring coil being wound around said central magnetic yoke;
    means for measuring hysteresis magnetization characteristics of a closed magnetic path formed by said magnetic yoke and said pressure vessel of the nuclear reactor by closely placing said magnetic yoke in contact with the inner wall or the outer wall of said pressure vessel of the nuclear reactor; and
    means for obtaining a coercive force from the hysteresis magnetization characteristics to check from the coercive force the degradation of a material comprising said pressure vessel of the nuclear reactor at a portion of the magnetic path formed in said pressure vessel of the nuclear reactor.

5. An apparatus for checking the degradation of the pressure vessel of a nuclear reactor as claimed in claim 4, further comprising a plurality of magnetic flux sensors attached to a sectional area of said central magnetic yoke which is closely placed in contact with said pressure vessel of the nuclear reactor.

6. An apparatus for checking the degradation of the pressure vessel of a nuclear reactor comprising:
    a magnetic yoke having an appropriate length and cross-sectional area of a magnetic path, an exciting coil, and a magnetic flux measuring coil;
    means for measuring hysteresis magnetization characteristics of a closed magnetic path formed by said magnetic yoke and said pressure vessel of the nuclear reactor by closely placing said magnetic yoke in contact with the inner wall or the outer wall of said pressure vessel of the nuclear reactor; and
    means for obtaining a coercive force from the hysteresis magnetization characteristics to check from the coercive force the degradation of a material comprising said pressure vessel of the nuclear reactor at a portion of the magnetic path formed in said pressure vessel of nuclear reactor, wherein said magnetic yoke includes a magnetic yoke member for varying the sectional area of end portions of said magnetic yoke to vary the length and cross-sectional area of the equivalent magnetic path of the closed magnetic path.

7. An apparatus for checking the degradation of the pressure vessel of a nuclear reactor as claimed in claim 6, wherein said magnetic yoke member is a magnetic yoke piece that is part of said end portion of said magnetic yoke detachable from said end portion of said magnetic yoke.

8. An apparatus for checking the degradation of the pressure vessel of a nuclear reactor comprising:
- a first magnetic yoke having an appropriate length and cross-sectional area of a magnetic path a first exciting coil, and a magnetic flux measuring coil;
- means for measuring hysteresis magnetization characteristics of a closed magnetic path formed by said magnetic yoke and said pressure vessel of the nuclear reactor by closely placing said magnetic yoke in contact with the inner wall or the outer wall of said pressure vessel of the nuclear reactor; and
- means for obtaining a coercive force from the hysteresis magnetization characteristics to check from the coercive force the degradation of a material comprising said pressure vessel of the nuclear reactor at a portion of the magnetic path formed in said pressure vessel of nuclear reactor; and
- a second magnetic yoke having an appropriate length and cross-sectional area of a second magnetic path and a second exciting cell, said second magnetic yoke being placed closely in contact with or in proximity to the outer wall or the inner wall opposite to the inner wall or the outer wall closely in contact with or in proximity to said first magnetic yoke, opposite to said second magnetic yoke.

9. A method of checking the degradation of the pressure vessel of a nuclear reactor comprising the steps of:
- closely placing a plurality of magnetic yokes having different lengths and cross-sectional areas of magnetic paths, exciting coils and a magnetic flux measuring means, or a magnetic yoke having a variable length and cross-sectional area of a magnetic path, an exciting coil, and a magnetic flux measuring means in contact with the inner wall or the outer wall of said pressure vessel of the nuclear reactor;
- measuring hysteresis magnetization characteristics of a plurality of closed magnetic paths formed by said magnetic yoke(s) and said pressure vessel of the nuclear reactor;
- obtaining from the hysteresis magnetization characteristics the distribution of coercive force in the direction of thickness of said pressure vessel of the nuclear reactor; and
- checking from the distribution of the coercive force the distribution of the degradation of a material comprising said pressure vessel of the nuclear reactor in the direction of thickness thereof, wherein said magnetic yoke is divided into three parallel magnetic circuits including a right magnetic yoke, a central magnetic yoke and a left magnetic yoke, and said magnetic flux measuring means including a magnetic flux measuring coil being wound around said central magnetic yoke to measure the hysteresis magnetization characteristics.

10. An apparatus for checking the degradation of the pressure vessel of a nuclear reactor comprising:
- a plurality of magnetic yokes having different lengths and cross-sectional areas of magnetic paths, exciting coils, and magnetic flux measuring means, or a magnetic yoke having a variable length and cross-sectional area of a magnetic path, an exciting coil, and magnetic flux measuring means, said magnetic flux measuring means including a magnetic flux measuring coil, said magnetic yoke divided into three parallel magnetic circuits including a right magnetic yoke, a central magnetic yoke and a left magnetic yoke, and said magnetic flux measuring coil being wound around said central magnetic yoke;
- means for measuring hysteresis magnetization characteristics of a plurality of closed magnetic paths formed by said magnetic yoke(s) and said pressure vessel of the nuclear reactor by closely placing said magnetic yoke(s) in contact with the inner wall of the outer wall of said pressure vessel of the nuclear reactor; and
- means for obtaining from the hysteresis magnetization characteristics the distribution of coercive force in the direction of thickness of the pressure vessel of the nuclear reactor to check from the distribution of the coercive force the distribution of the degradation of a material comprising the pressure vessel of the nuclear reactor in the direction of thickness thereof.

11. A method of checking the degradation of the pressure vessel of a nuclear reactor comprising the steps of:
- closely placing a magnetic yoke having an appropriate length and cross-sectional area of a magnetic path and an exciting coil, in contact with the inner wall or the outer wall of said pressure vessel of the nuclear reactor, wherein said magnetic yoke is divided into three parallel magnetic circuits including a right magnetic yoke, a central magnetic yoke and a left magnetic yoke;
- attaching a plurality of magnetic flux sensors at the cross sectional area of said magnetic yoke and closely placed in contact with said wall;
- divisionally measuring hysteresis magnetization characteristics of closed magnetic paths formed by said magnetic yoke and said pressure vessel of the nuclear reactor by said magnetic flux sensors;
- obtaining a plurality of coercive forces from a plurality of the hysteresis magnetization characteristics measured by said magnetic flux sensors;
- obtaining from said plurality of coercive forces the distribution of the coercive forces in the direction of thickness of said pressure vessel of the nuclear reactor; and
- checking from the distribution of the coercive forces the distribution of the degradation of a material comprising said pressure vessel of the nuclear reactor in the direction of thickness thereof,
- wherein the magnetic flux sensors are attached only to the cross-sectional area of said central magnetic yoke closely placed in contact with said pressure vessel of the nuclear reactor to measure the hysteresis magnetization characteristics.

12. An apparatus for checking the degradation of the pressure vessel of a nuclear reactor comprising:
- a magnetic yoke having an appropriate length and cross-sectional area of a magnetic path and an exciting coil, said magnetic yoke divided into three magnetic circuits including a right magnetic yoke, a central magnetic yoke and a left magnetic yoke;
- a plurality of magnetic flux sensors attached to the cross sectional area of said central magnetic yoke which is closely placed in contact with the inner wall or the outer wall of said pressure vessel of the nuclear reactor;

means for divisionally measuring in cooperation with said plurality of magnetic flux sensors hysteresis magnetization characteristics of a closed magnetic path formed by said magnetic yoke and said pressure vessel of the nuclear reactor when said magnetic yoke is closely placed in contact with said pressure vessel of the nuclear reactor; and means for obtaining coercive forces from the hysteresis magnetization characteristics measured by said divisionally measuring means, obtaining from the coercive forces the distribution of the coercive forces in the direction of thickness of said pressure vessel of the nuclear reactor and checking from the distribution of the coercive forces the distribution of the degradation of a material comprising said pressure vessel of the nuclear reactor in the direction of thickness thereof.

* * * * *

UNITED STATES PATENT AND TRADEMARK OFFICE
CERTIFICATE OF CORRECTION

PATENT NO. : 5,687,204
DATED : Nov. 11, 1997
INVENTOR(S) : Katsuyuki Ara, Nobuya Nakajima, Noriya Ebine It is certified that error appears in the above-identified patent and that said Letters Patent is hereby corrected as shown below:

On the title page:
Please add agent name: Banner & Witcoff, Ltd.

Signed and Sealed this

Tenth Day of March, 1998

Attest:

BRUCE LEHMAN

Attesting Officer     Commissioner of Patents and Trademarks